(12) United States Patent
Monroe (10) Patent No.: US 10,407,020 B2
(45) Date of Patent: Sep. 10, 2019

(54) SYSTEM AND METHODS ASSOCIATED WITH A SAFETY DEVICE FOR VEHICLES

(71) Applicant: Randy Marcus Monroe, Spicewood, TX (US)

(72) Inventor: Randy Marcus Monroe, Spicewood, TX (US)

(*) Notice: Subject to any disclaimer, the term of this patent is extended or adjusted under 35 U.S.C. 154(b) by 66 days.

(21) Appl. No.: 15/697,340

(22) Filed: Sep. 6, 2017

(65) Prior Publication Data

US 2018/0072261 A1 Mar. 15, 2018

Related U.S. Application Data

(60) Provisional application No. 62/385,432, filed on Sep. 9, 2016.

(51) Int. Cl.
| | |
|---|---|
| *B60R 21/33* | (2006.01) |
| *B62J 27/00* | (2006.01) |
| *B60R 21/203* | (2006.01) |
| *B60R 21/00* | (2006.01) |

(52) U.S. Cl.
CPC .......... *B60R 21/33* (2013.01); *B60R 21/2035* (2013.01); *B62J 27/00* (2013.01); *B60R 2021/0088* (2013.01); *B60R 2021/0097* (2013.01)

(58) Field of Classification Search
CPC ... B60R 21/22; B60R 21/33; B60R 2021/088; B60R 2021/165; B62J 27/00; B62J 99/00
USPC .................................................... 280/730.1
See application file for complete search history.

(56) References Cited

U.S. PATENT DOCUMENTS

| | | | | | |
|---|---|---|---|---|---|
| 2,649,311 | A | * | 8/1953 | Hetrick ................. | B60R 21/268 180/90 |
| 3,706,462 | A | * | 12/1972 | Lilly ....................... | B60R 21/18 280/733 |
| 3,930,667 | A | * | 1/1976 | Osuchowski ........ | A41D 13/018 280/730.1 |
| 4,258,931 | A | * | 3/1981 | Lee ....................... | B60R 21/013 280/734 |
| 5,242,193 | A | * | 9/1993 | Humpal ................ | B60R 21/33 222/3 |
| 5,472,231 | A | * | 12/1995 | France .................... | B60R 21/18 280/733 |
| 7,029,029 | B2 | * | 4/2006 | Yamazaki .............. | B62J 27/00 180/219 |
| 7,104,568 | B2 | * | 9/2006 | Miyata ................... | B60R 21/20 280/730.1 |

(Continued)

FOREIGN PATENT DOCUMENTS

| | | | | | |
|---|---|---|---|---|---|
| DE | | 10004307 A1 | * | 8/2001 | ............ B60R 21/16 |
| DE | | 10106437 A1 | * | 8/2002 | ........... B60R 21/203 |

(Continued)

OTHER PUBLICATIONS

YouTube video "Pete's airbag bike", retreived from http://www.youtube.com/watch?v=dtZGPAaaXs, published Mar. 17, 2010.*

*Primary Examiner* — Ruth Ilan (74) *Attorney, Agent, or Firm* — Pierson IP, PLLC (57) ABSTRACT

Embodiments disclose systems and methods associated with safety devices for vehicles. Specifically, embodiments are directed towards a user operated, manually controlled, inflatable safety device for off-road vehicles, which may reduce, eliminate, or lessen upper body and head injuries.

7 Claims, 10 Drawing Sheets

(56) References Cited

U.S. PATENT DOCUMENTS

| | | | | |
|---|---|---|---|---|
| 7,198,287 | B2* | 4/2007 | Miyata | B60R 21/16 |
| | | | | 280/730.1 |
| 7,273,226 | B2* | 9/2007 | Miyata | B60R 21/2165 |
| | | | | 280/728.2 |
| 7,357,407 | B2* | 4/2008 | Kuroe | B60R 21/217 |
| | | | | 280/728.2 |
| 2003/0132616 | A1* | 7/2003 | Yanagibashi | B60R 21/2171 |
| | | | | 280/730.1 |

FOREIGN PATENT DOCUMENTS

| | | | | |
|---|---|---|---|---|
| DE | 10216900 A1 * | 3/2004 | | B62J 27/00 |
| DE | 102011116444 A1 * | 4/2013 | | B60R 21/235 |
| WO | WO-9519279 A1 * | 7/1995 | | B60R 21/20 |
| WO | WO-2011064134 A1 * | 6/2011 | | B60R 21/20 |

* cited by examiner

SYSTEM AND METHODS ASSOCIATED WITH A SAFETY DEVICE FOR VEHICLES

CROSS-REFERENCE TO RELATED APPLICATIONS

This application claims a benefit of priority under 35 U.S.C. § 119 to Provisional Application No. 62/385,432 filed on Sep. 9, 2016, which is fully incorporated herein by reference in its entirety.

TECHNICAL FIELD

Embodiments disclose systems and methods associated a safety device for vehicles. Specifically, embodiments are directed towards a user operated and manually controlled inflatable safety device for off-road vehicles, which may reduce, eliminate, or lessen upper body, face, and head injuries.

BACKGROUND

Riding in a moving vehicle can be dangerous and lead to injuries. Accidents associated with vehicles such as motorcycles, dirt bikes, bicycles, ATVs, etc. can lead to more serious injuries due to these vehicles not including a full enclosure for a rider and other inherent risks.

Furthermore, extreme off-road sports including motocross and supercross are dangerous due to powerful equipment, tight turns, higher rates of speed and velocities, jumps, sharper inclines and declines, etc. Currently, to protect themselves from inevitable injuries, riders wear safety devices, such as helmets, braces, specialized boots, gloves, goggles, mouthpieces, etc. However, these pieces of equipment are static, nonmoving or preventative methods that to not take into account situational hazards that can be minimized if manually controlled by a rider.

Accordingly, needs exist for safety devices for vehicles that are user operated and manually controlled, wherein responsive to a rider performing actions a safety device may be inflated.

SUMMARY

Embodiments described herein disclose safety devices that are configured to be coupled to the handlebars of a vehicle, such as a motorcycle, dirt bike, or ATV. Embodiments described herein include an air source, housing, and inflatable bladder.

While in use, when a rider believes that they may crash or experience a harmful impact, the rider may perform actions to deploy the safety device. Responsive to the device being deployed, a regulated air source inflates a compressed, folded bladder positioned within a recessed compartment of the housing. As the bladder expands beyond the sizing of the compartment, the bladder may exit the housing through a flexible trap door within a fitted covering, and be positioned between the rider and the vehicle. Thus, embodiments may reduce the impact of both serious and non-serious injuries.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
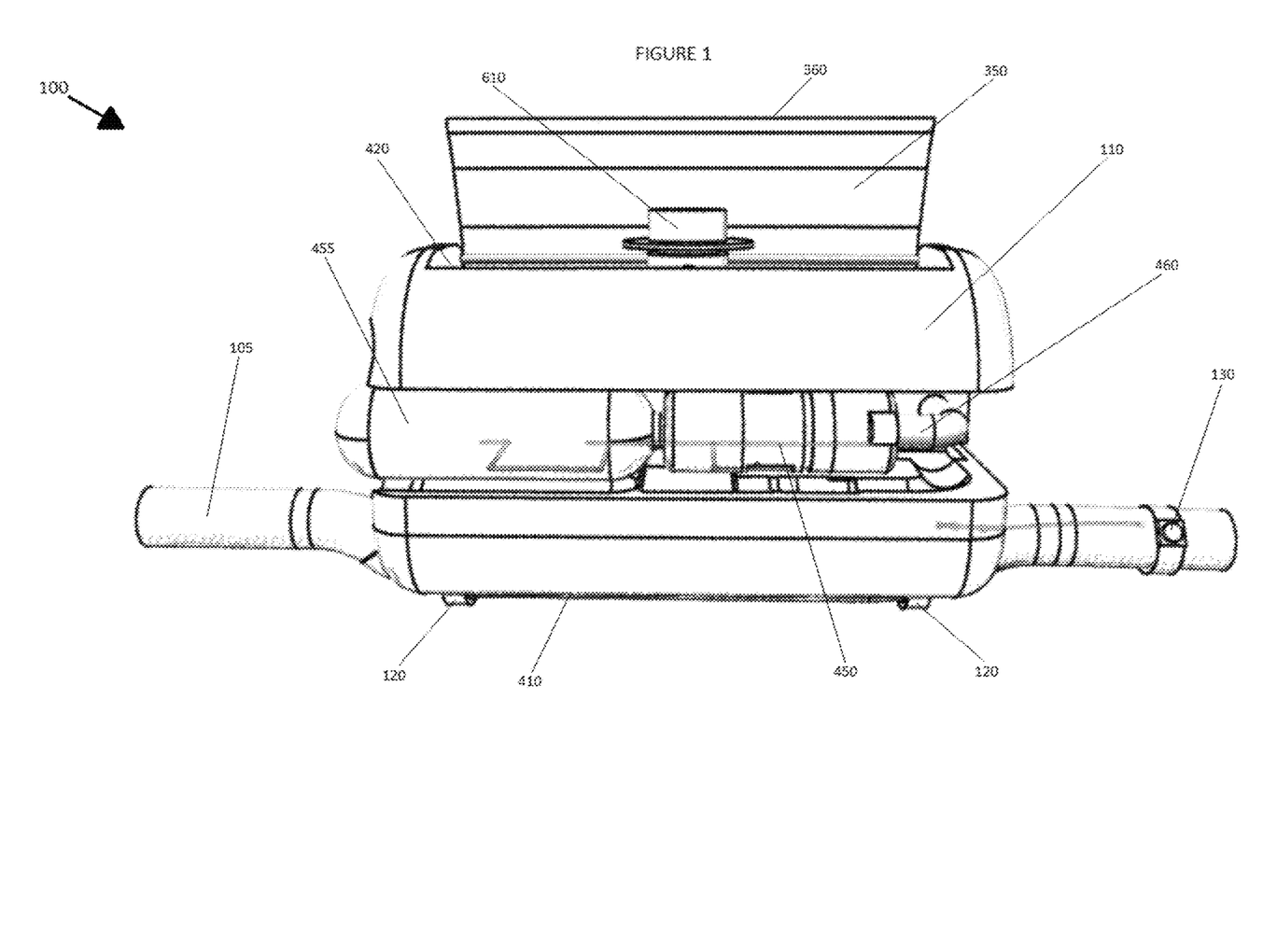
FIG. 1 depicts a front view of a safety device, according to an embodiment.

FIG. 1 depicts a front view of a safety device 100, according to an embodiment. Safety device 100 may be configured to be mounted to handlebars 105 of a vehicle, such as a motorcycle, dirt bike, or ATV. However, the vehicle may be any type of device that is configured to move, including boats, jet skis, snow mobiles, bicycles, etc. Safety device 100 may be configured to form a cushion device and/or dynamic pad between the rider and the vehicle to dampen forces exerted upon a rider responsive to a crash. Safety device 100 may include housing 110, coupling mechanisms 120, and user interface 130.

Housing 110 may be a device that is configured to hold and secure the components of safety device 100. Housing 110 may be configured to be positioned between a rider and portions of handlebars 105 while the rider is riding the vehicle. Specifically, housing 110 may be configured to be secured to the handlebar risers of a triple clamp assembly of the vehicle. Housing 110 may be generally rectangular in shape. However, in other embodiments, housing 110 may be other shapes and/or sizes. Housing 110 may have an outer body that is comprised of a soft, semi-rigid material, such as a foam-based, soft composite urethane. Housing 110 may include a hollow inner chamber configured to store internal components of safety device 100. Housing 110 may be covered by a removable plastic, vinyl, or similar fitted covering, which may protect housing 110 from wear and tear from the weather, debris, and other elements. The covering may keep the uninflated bladder within the recessed compartment within housing 110. In embodiments, housing 110 may include a hinged door 350, and a a handlebar cutout assembly 410, bladder compartment 420, a battery assembly, a compressed air cartridge and housing, a pressure regulator 450, solenoid 455, and high pressure tubing 460.

Hinged door 350 may be positioned on an upper surface of housing 110. Hinged door 350 may have an angle of rotation extending across a distal end of housing 110, such that hinged door 350 may rotated away from a rider of the vehicle. More specifically, the distal end of hinged door 350 may remain in a fixed position, and the proximal end of hinged door 350 may rotated away from the proximal end of covering 300. In embodiments, the proximal end of hinged door 350 may include an edge 360 with adhesives. The adhesives are configured to temporarily couple hinged door 350 with housing 110.

Handlebar cutout assembly 410 may be positioned on a lower surface of housing 110. Handlebar cutout assembly 410 may have a shape that is configured to correspond to handlebars of a vehicle, such that a handlebar 105 may extend through housing 410. For example, handlebar cutout assembly 410 may be a curved cutout.

Bladder compartment 420 may be a chamber within housing 110 configured to hold an inflatable bladder. Bladder compartment 420 may be positioned below hinged door 350. A surface of bladder compartment 420 may include a bladder connector point to receive a bladder connector 610. Bladder connector 610 may be a device that enables the bladder to be coupled and decoupled from bladder compartment 420. Furthermore, bladder connector 610 may be configured to allow the regulated air into the bladder via high pressure tubing 460. Bladder connector 610 may be comprised of durable materials. When bladder connector 610 is disconnected from high pressure tubing 460, the bladder may be disconnected from housing 110. Thus, the inflatable bladder may be removed and replaced as desired by a rider. In FIG. 1, bladder connector 610 is shown detached from bladder compartment 420. However, bladder connector 610 may be embedded within an upper surface of bladder compartment 420 such that it does not touch hinge door 350.

The battery assembly may be a device that is configured to supply power to elements of safety device 100. The battery assembly may be configured to operate by using a power source, removable batteries, or renewable energy sources, such as solar panels. In embodiments, the battery assembly may be removable from housing 110.

The compressed air cartridge and housing may be configured to be a source of air to inflate the bladder positioned within bladder compartment 420. The compressed air cartridge and housing may be a replaceable air cartridge that can be removed from housing 110. The compressed air cartridge and housing may be a CO2 cartridge that is inserted into housing 110 through a side panel. In embodiments, the compressed air cartridge may be pressed and turned into a cartridge housing until the air cartridge is fully enclosed within a foam pad of housing 110. Upon installation within housing 110, a puncture pin assembly, which separates the air cartridge from pressure regulator 450, may create a puncture or hole in the air cartridge. Responsive to the puncture pin assembly, forming the hole in the air cartridge, the air cartridge may be primed and ready for use. Then, the air cartridge may provide air that is configured to inflate the bladder through high pressure tubing 460, pressure regulator 450, and solenoid 455.

High pressure tubing 460 may be a conduit of air released from the air cartridge, wherein high pressure tubing 460 may connect the air cartridge, pressure regulator 450, solenoid 455, and the bladder. High pressure tubing 460 may be tubing comprised or plastic or other high pressure tolerant materials.

The pressure regulator 450 may be a device that is located in the rear of housing 110, wherein pressure regulator 450 may be positioned between air cartridge 440 and solenoid 455. Pressure regulator 450 may be configured to control the pressure of air dispensed from the air cartridge to solenoid 455 to ensure the dispensed air is within predetermined pressure rating levels.

The solenoid 455 may be a device that is positioned between pressure regulator 450 and bladder compartment 420. Solenoid 455 is configured to control air flow into high pressure tubing 460 for the air bladder. Responsive to a rider performing actions on user interface 130, solenoid 455 may receive an actuation signal. When solenoid 455 receives the actuation signal, a port within solenoid 455 may open allowing pressure regulated air from the air cartridge and pressure regulator 450 to inflate bladder. Responsive to the rider no longer engaging with the user interface 130, the port may close, which may stop air from flowing into the bladder from pressure regulator 450.

Coupling mechanisms 120 may be straps, ties, latches, bands, fasteners, etc. configured to couple or remove housing 110 to handlebars 105. In embodiments, coupling mechanisms 120 are affixed to a lower surface of housing 110, and wrap around handlebar 105 to secure housing 110 to handlebar 105. This may prevent housing 110 from being decoupled from handlebar 105 as the vehicle moves, bounces, twists, etc.

User interface 130 may be a button, actuator, etc. that is configured to be coupled to handlebar 105 outside of the triple clamps. Responsive to a user performing actions on user interface 130, such as depressing a button, a bladder within housing 110 may be inflated. User interface 130 may be communicatively connected with components positioned within housing 110, which may connected via wired and/or wireless interfaces. In embodiments, user interface 130 may be a solenoid actuator button that is attached to the right or throttle side of handlebar 105 via a clamping mechanism. When a rider engages with user interface 130, the rider may depress a button in a steady or multi-press function, which in turn engages a solenoid to allow air to inflate the bladder.

Figure 2:
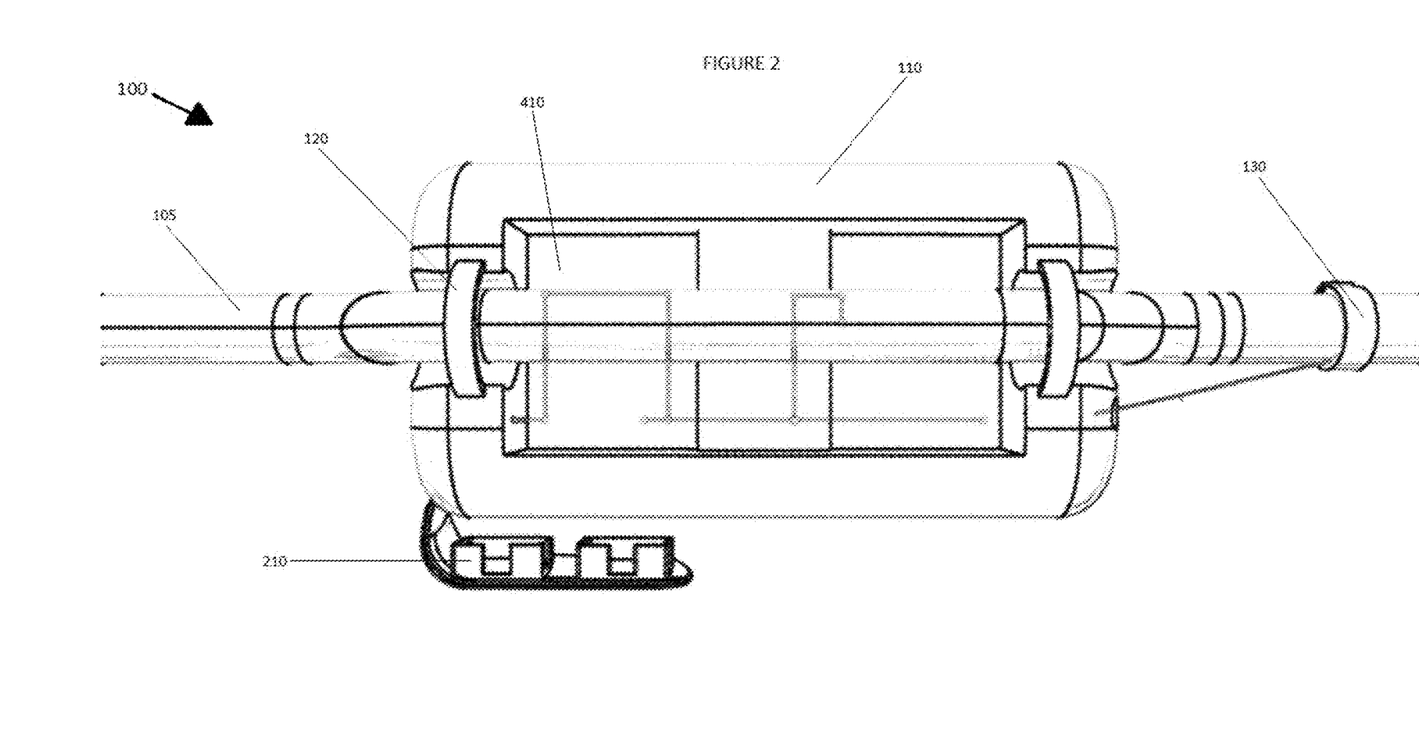
FIG. 2 depicts a bottom view of a safety device, according to an embodiment.

FIG. 2 depicts a bottom view of safety device 100, according to an embodiment. Certain elements shown in FIG. 2 are described above. For the sake of brevity, an additional description of these elements is omitted.

As depicted in FIG. 2, coupling mechanisms 120 may wrap around portions of handlebar 105 to secure housing 110 to the vehicle. As further depicted in FIG. 2, housing 110 may have a removable panel 210. In embodiments, an air cartridge and/or battery may be accessed via removable panel 210.

Figure 3:
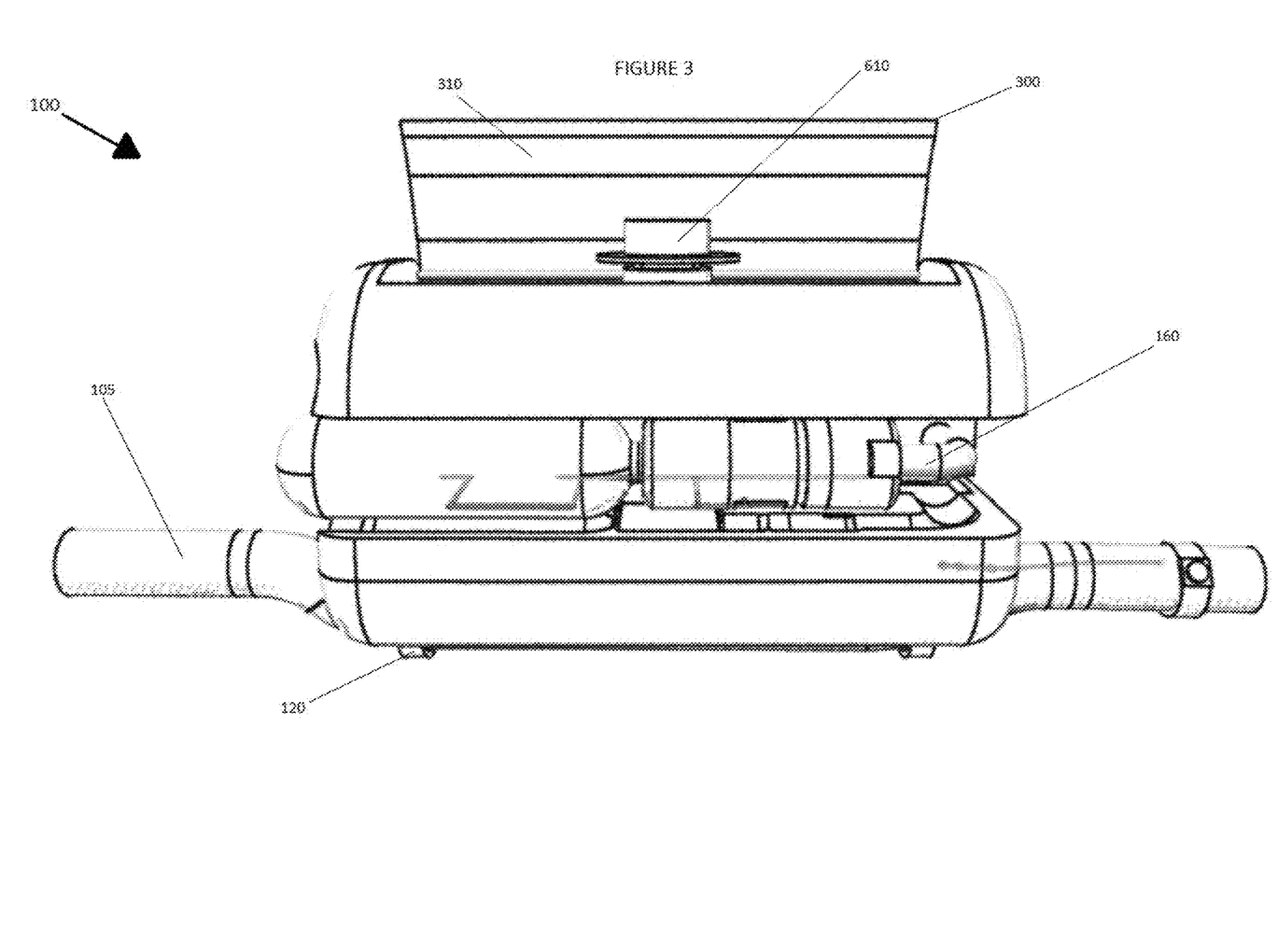
FIG. 3 depicts a front view of a housing, according to an embodiment.

FIG. 3 depicts a front view of housing 110, according to an embodiment. Certain elements shown in FIG. 3 are described above. For the sake of brevity an additional description of these elements is omitted.

Figure 4:
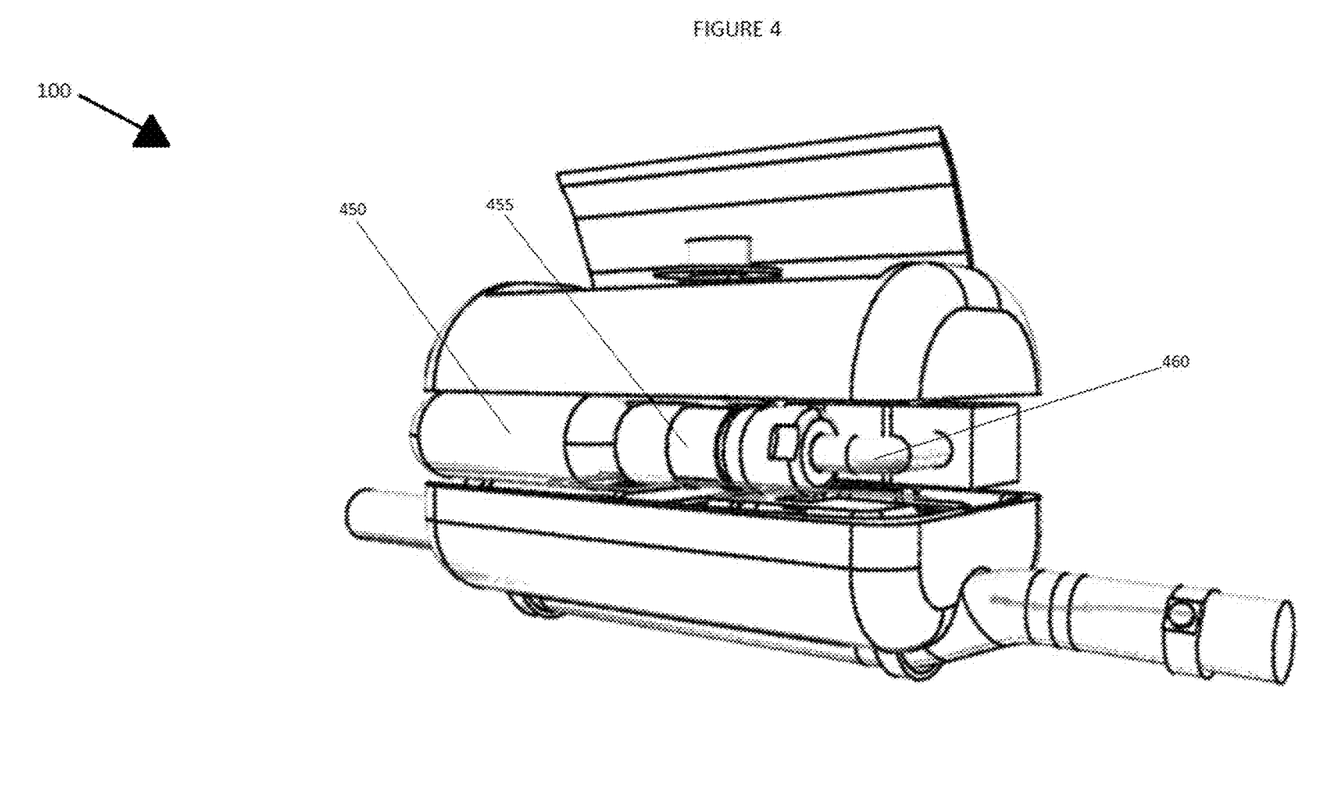
FIG. 4 depicts a rear view of the internal components of a housing, according to an embodiment.

FIG. 4 depicts a rear view of the internal components of housing 110, according to an embodiment. Certain elements shown in FIG. 4 are described above. For the sake of brevity, an additional description of these elements is omitted.

Figure 5:
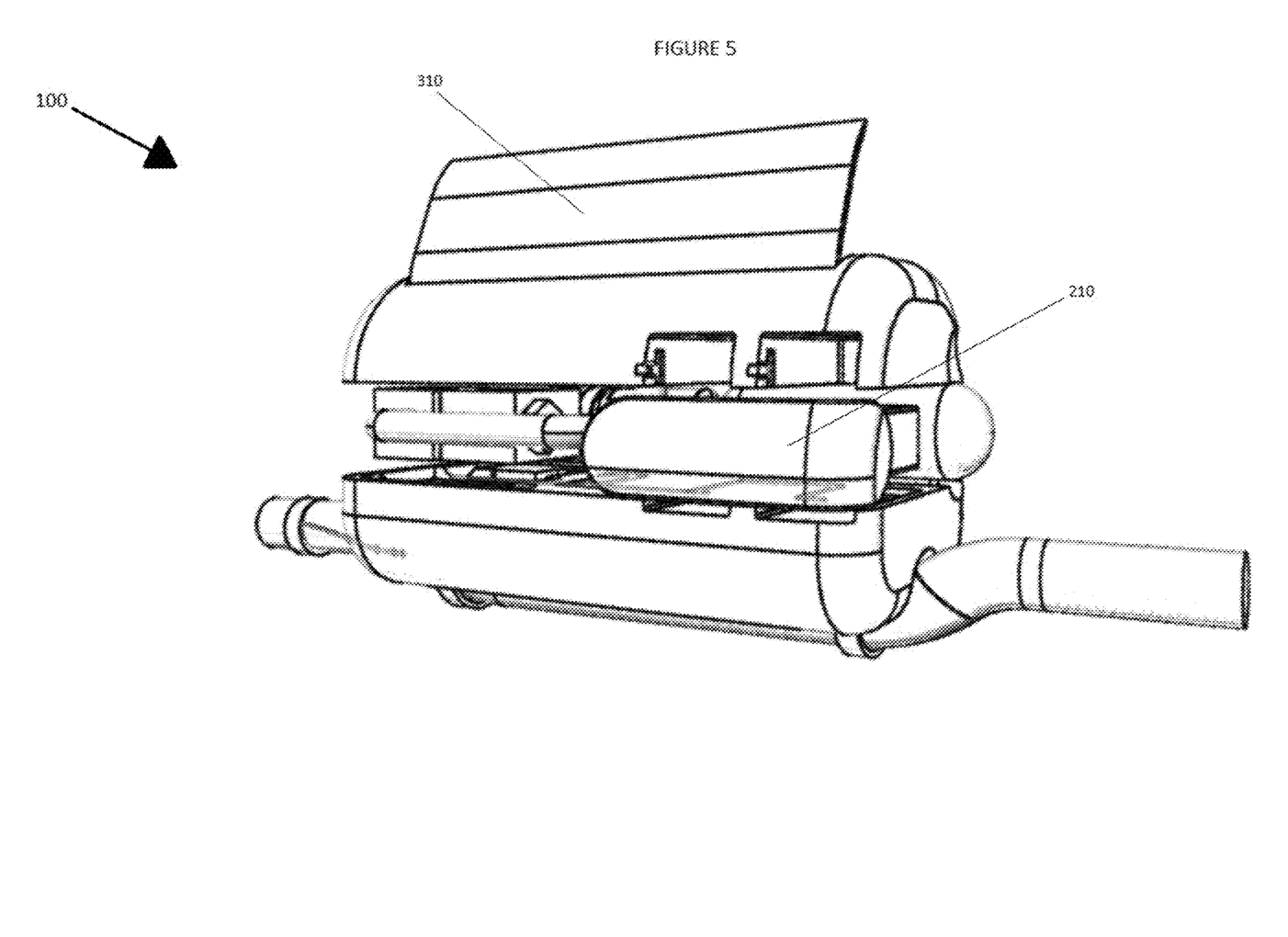
FIG. 5 depicts a rear view of the internal components of a housing, according to an embodiment.

FIG. 5 depicts a rear view of the internal components of housing 110, according to an embodiment. Certain elements shown in FIG. 5 are described above. For the sake of brevity, an additional description of these elements is omitted.

Figure 6:
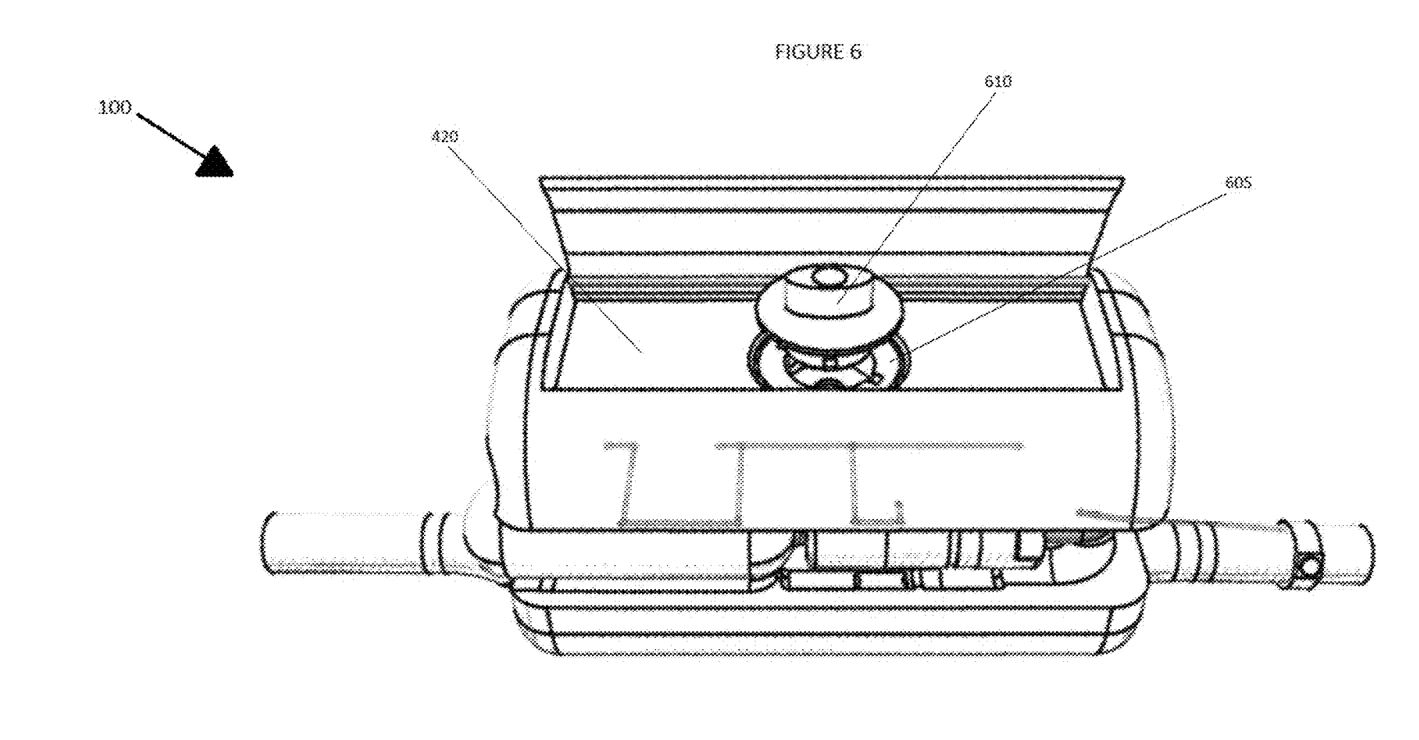
FIG. 6 depicts a top view of the internal components of a housing, according to an embodiment.

FIG. 6 depicts a top view of the internal components of housing 110, according to an embodiment. Certain elements shown in FIG. 6 are described above. For the sake of brevity, an additional description of these elements is omitted.

As depicted in FIG. 6, bladder connector 610 may be a removal conduit having a proximal end configured to be removably coupled to an inflatable bladder, and a distal end configured to be removably coupled to a bladder interface 605.

Bladder interface 605 may be positioned on a lower surface of bladder compartment 420, and may be configured to be selectively coupled with bladder connector 610. Bladder interface 605 may be any coupling mechanism that is configured to receive bladder connector 610 while maintain an airtight seal. For example, bladder interface 605 may include grooves, slots, etc. that are configured to receive and lock bladder connector 610 in place responsive to inserting bladder connector 605 into bladder interface and turning bladder connector 610. Furthermore, bladder interface 605 may be configured to transport pressurized air from housing 110 through bladder connector 610 and into the bladder.

Figure 7:
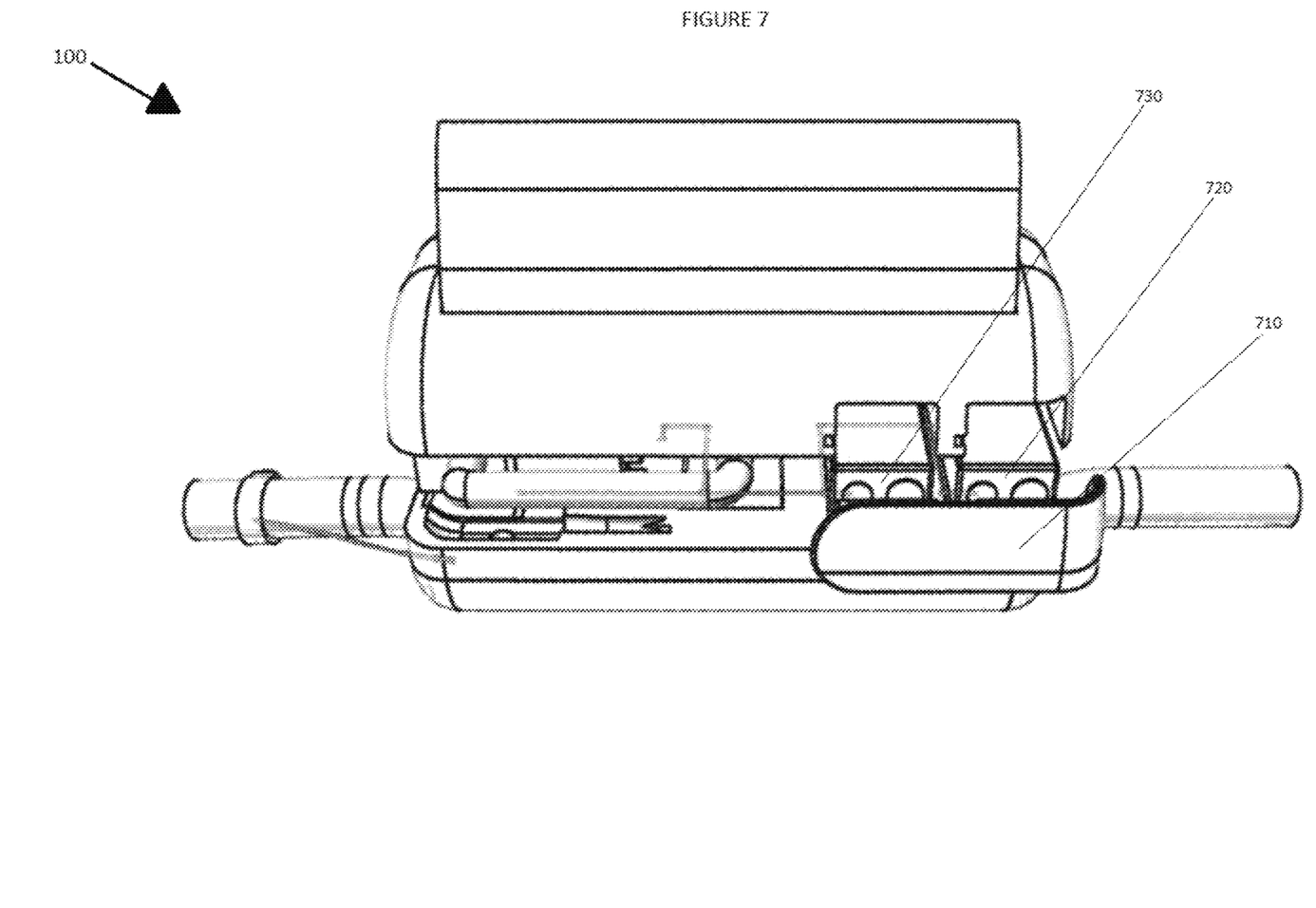
FIGS. 7-8 depict a rear view of the internal components of a housing, according to an embodiment.
Figure 8:
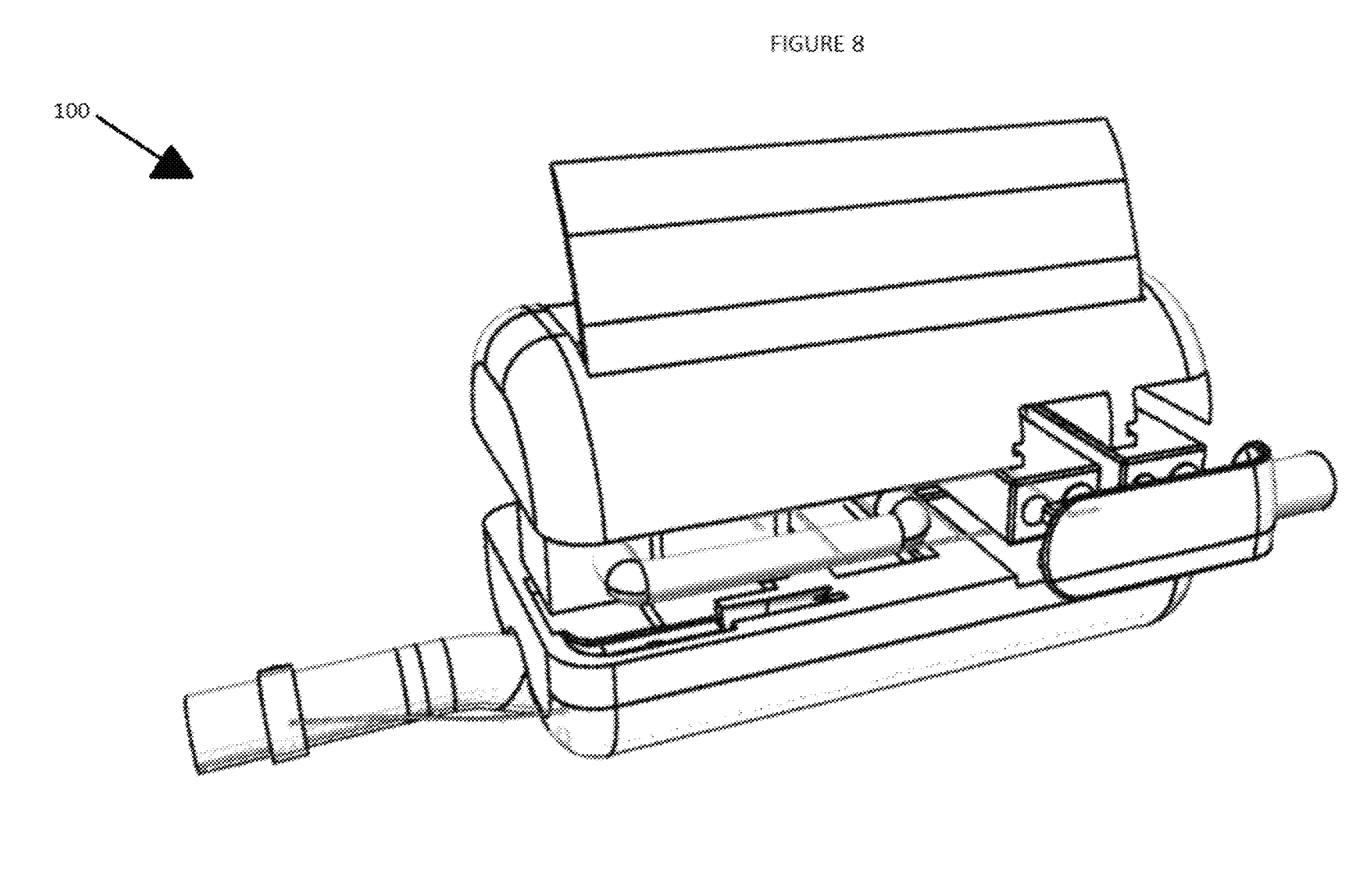

FIGS. 7-8 depict a rear view of the internal components of housing 110, according to an embodiment. Certain elements shown in FIGS. 7 and 8 are described above. For the sake of brevity, an additional description of these elements is omitted.

As depicted in FIGS. 7 and 8, housing 110 may include a removable cover 210. Removable cover 210 may allow access to the battery assembly 720 and the compressed air cartridge and housing 730. These components may be replaced by removing and replacing the components while removable cover 210 is removed.

Figure 9:
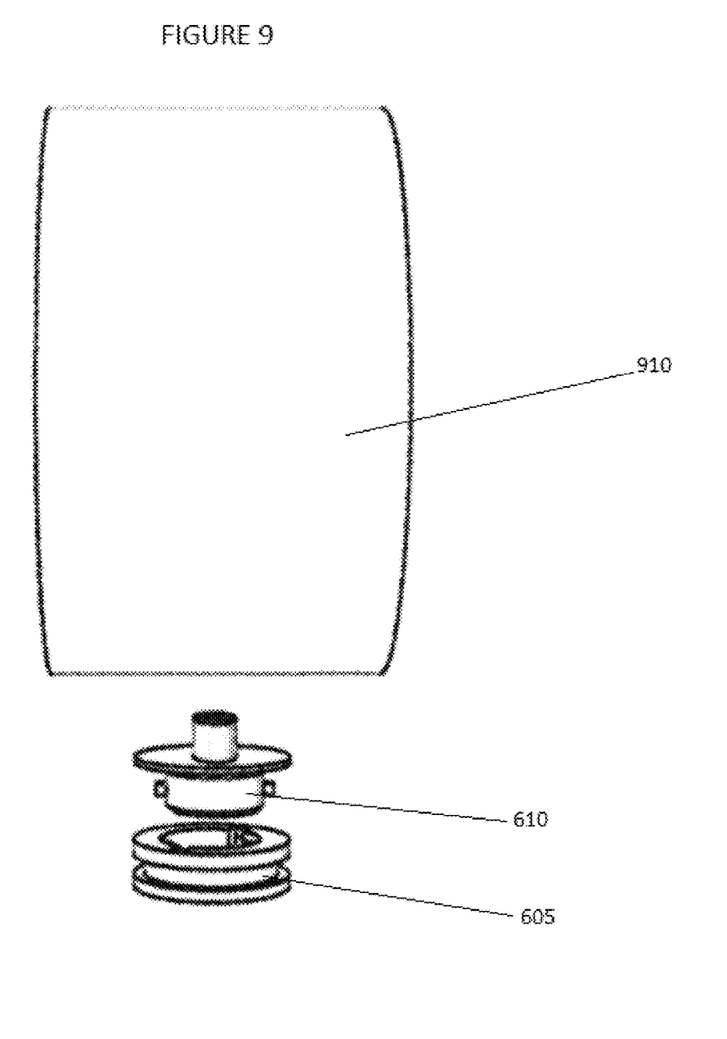
FIG. 9 depicts a bladder, according to an embodiment.

FIG. 9 depicts a bladder 910, according to an embodiment. Certain elements shown in FIG. 9 are described above. For the sake of brevity, an additional description of these elements is omitted.

Bladder 910 may be comprised of a highly flexible, durable fabric that is configured to inflated and deflated. Bladder 910 may also be comprised of material that has a high pressure tolerance to be able to withstand pressure regulated air inflating the bladder 910. Bladder 910 may include a cylindrical body and an expandable seam.

The cylindrical body may be configured to increase the diameter of bladder 910 responsive to being inflated to cover a greater percentage of area between a rider and the vehicle. In embodiments, bladder 910 may be configured to be housed within housing 110 before being inflated. Responsive to a user pressing a button on the user interface, bladder 910 may be inflated via the compressed air. When bladder 910 is inflated, the increase in size in bladder 910 may cause the hinged door to automatically open by rotating away from the user to position bladder 910 between the user and housing 110.

The expandable may be configured to fold over itself when bladder 910 is deflated, and to extend outward when bladder 910 is inflated. When bladder 910 is deflated, the ends of the cylindrical body may be positioned adjacent to each other. However, when the expandable seam is inflated, the expandable seam may create a distance between the ends of the cylindrical body.

Furthermore, bladder connector 610 may be configured to be inserted into an orifice on a lower end of bladder 910. This may form an airtight seal that allows bladder 910 to receive air to be inflated. Additionally, bladder connector 610 may interface with bladder 910 in a location within bladder compartment 420. Therefore, when not inflated, bladder 910 may be protected from the elements via housing 110.

Figure 10:
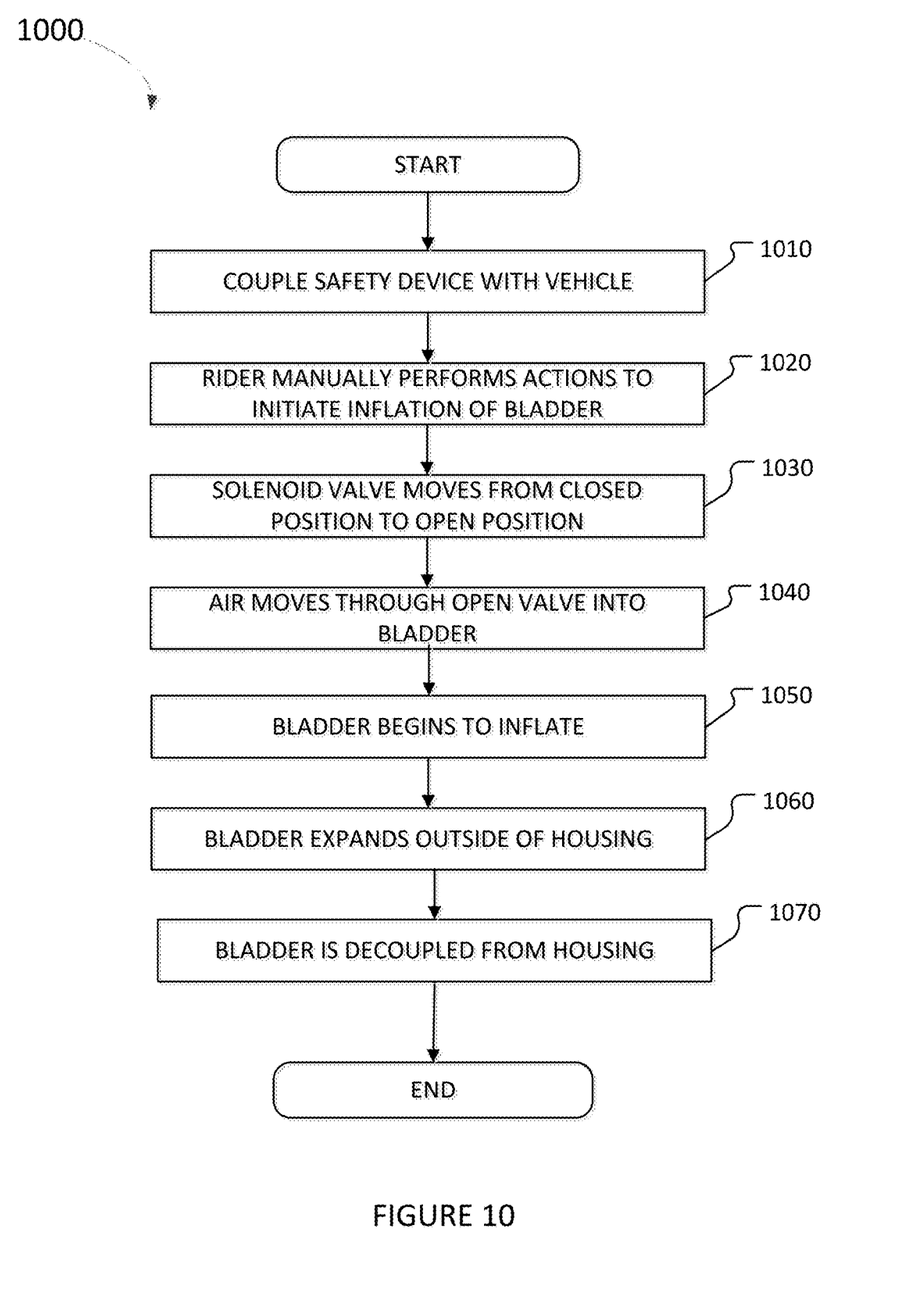
FIG. 10 illustrates a method for utilizing a safety device on a vehicle, according to an embodiment.

FIG. 10 illustrates a method 1000 for utilizing a safety device on a vehicle. The operations of method 900 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and are described below is not intended to be limiting.

At operation 1010, a housing associated with the safety device may be coupled to handlebars of a vehicle. Portions of the housing may be positioned underneath the riser/triple clamp assembly of the vehicle via straps, ties, latches, etc.

At operation 1020, a rider may engage with a user interface to initiate an inflation process. The rider may initiate the inflation process by manually pressing a solenoid actuator.

At operation 1030, responsive to the rider manually initiating the inflation process, a solenoid valve may move from a closed position to an open position. When the valve moves to the open position, air within a cartridge may flow into a pressure regulator. The pressure regulator may control the pressure rating levels of air flowing through tubing from the pressure regulator to a solenoid.

At operation 1040, air may move through the open valve into the bladder via high pressure tubing.

At operation 1050, the bladder may receive air and be inflated.

At operation 1060, responsive to the bladder being inflated, the bladder may expand in size. The force caused by the expansion of the bladder may cause a hinged door positioned on an upper surface of the housing to rotate away from the rider, such that the bladder may expand outside of the housing. When the bladder is fully inflated, the inflated bladder may create an air-filled cushion or barrier between the rider and portions of the vehicle.

At operation 1070, the inflated bladder may be decoupled from the housing. The inflated bladder may be decoupled from the housing by rotating and pulling on a bladder connector, which connects the bladder to the housing and underlying high pressure tubing, wherein the inflated air enters the bladder through the bladder connector.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A safety device for vehicles comprising:
a housing configured to be mounted on handlebars of a vehicle;
an inflatable bladder being configured to be positioned within the housing in a first mode, the inflatable bladder being configured to be inflated and protrude outward from the housing in a second mode;
a hinged door positioned on an upper surface of the housing, the hinged door being configured to be closed in the first mode and rotate away from a user in the second mode;
a user interface positioned on the handlebars the user interface being configured to receive actions from the user to initiate a sequence to change the inflatable bladder from the first mode to the second mode;
a compressed air cartridge positioned within the housing, the compressed air cartridge being configured to supply air to the inflatable bladder responsive to the user interface receiving actions from the user;
wherein the housing includes a handlebar cutout assembly positioned on a lower surface of the housing, the handlebar cutout assembly having recessed portions that correspond to the handlebars.

2. The safety device of claim 1, further comprising:
a bladder compartment within the housing configured to store the bladder in the first mode, the bladder compartment being positioned below the hinged door;
a bladder interface being configured to receive a bladder connector, the bladder connector having a first end being configured to be inserted into the inflatable bladder and a second end being configured to be inserted into the bladder interface.

3. The safety device of claim 2, wherein the bladder connector is removably coupled to the bladder interface.

4. The safety device of claim 1, wherein in the second mode the inflatable bladder is configured to create an air-filled cushion between the user and the handlebars.

5. The safety device of claim 1, wherein the hinged door includes a first end and a second end, the first end being fixedly coupled to the housing along a distal edge of the upper surface of the housing, and the second end is temporarily coupled to a proximal end of the upper surface of the housing.

6. The safety device of claim 1, wherein force created by the inflatable bladder being inflated causes the hinged door to open.

7. The safety device of claim 1, wherein portions of the housing are configured to be positioned underneath a triple clamp assembly of a motorized bicycle.

\* \* \* \* \*